Oct. 31, 1939.   A. G. H. STRAATMAN   2,178,191
APPARATUS FOR ORIENTING BOREHOLES
Filed Oct. 3, 1938

Inventor: Alphons G. H. Straatman
By his Attorney:

Patented Oct. 31, 1939

2,178,191

UNITED STATES PATENT OFFICE 2,178,191

APPARATUS FOR ORIENTING BOREHOLES

Alphons Gerard Hubert Straatman, The Hague, Netherlands, assignor to Shell Development Company, San Francisco, Calif., a corporation of Delaware Application October 3, 1938, Serial No. 233,044
In the Netherlands October 4, 1937

4 Claims. (Cl. 33—205.5)

This invention pertains to methods of orienting boreholes, and relates more specifically to an apparatus whereby the extent of the deviation of a borehole, and the direction of such deviation may be readily and accurately determined.

It is the object of the present invention to provide for this purpose an apparatus of simple, rugged and compact construction capable of being lowered or dropped into boreholes, casings or drill strings of relatively small diameter, and of withstanding the wear and tear attendant such operations, said apparatus comprising essentially at least one light source projecting a beam on a light-sensitive surface to form an image thereon, said beam passing through a body comprising at least two immiscible fluids, such as two liquids, or a gas and a liquid, of different optical densities, said media forming therebetween at least one interface capable of shifting its position by gravity, whereby refraction effects are utilized to determine the extent of deviation of the apparatus from the vertical.

A compass or similar indicating device may be further interposed between the light source and the light-sensitive surface and cooperate in producing an oriented deviation record.

The present invention will be understood from the following description taken with reference to the attached drawing, wherein.

Figure 1:
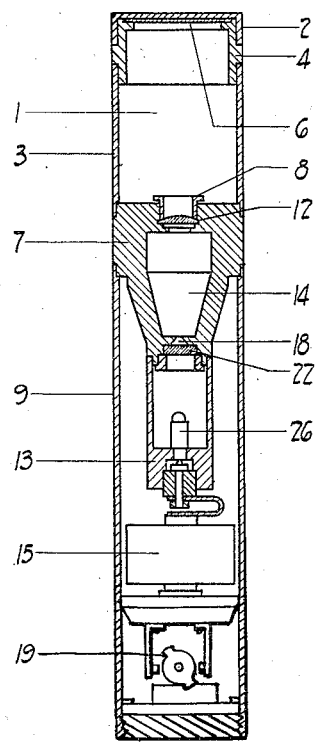
Fig. 1 is a diagrammatic elevation view in cross-section of an embodiment of the present apparatus used for measuring the deviation of a borehole from the vertical.

Referring to Fig. 1, a fluid-tight casing 1, consisting of a single or of a plurality of suitably connected tubular sections 3 and 9, which may preferably be made of a non-magnetic metal, is closed at the top by a cap 2, and at the bottom by fluid-tight chamber 19. A holder 4, supporting a light-sensitive surface 6, such as a plate, a film, or a photo-electric cell, is suitably affixed within the casing. A fitting 7, having a hollow portion forming a chamber 14, adapted to be filled with liquid, is affixed within the casing at some distance from plate 6. Chamber 14 is closed at the top by a lens 12, held by a nut 8, and is provided in its lower portion with a diaphragm opening 18, the liquid filling chamber 14 being prevented from escaping through said opening by means of a plate 22, which may be conveniently made of a material such as monochromatic light glass. A socket 13, attached to fitting 7, carries a source of light such as an electric bulb 26, receiving its current from a battery or dry cell 15, said current being turned on or off by means of a switching mechanism 19. This mechanism may be of the contact type, operable when the present device strikes against some stop or obstruction within the well, or of the clock type, designed to switch the current on or off at predetermined time intervals. This switching mechanism is of conventional construction and is not shown in the drawing as forming no part of this invention.

The various parts of the fitting 7 are arranged so that an image of the diaphragm opening 18 is focused by the lens 12 on the light-sensitive surface 6.

The chamber 14 is filled to a certain level with a properly selected liquid having a desired refractive power, and is shaped and proportioned in such a manner as to cause variations due to a rise of level occurring with a temperature change to be substantially neutralized by corresponding variations in the refractive index of the liquid. For further accuracy, two or more immiscible liquids having different optical densities may likewise be used in chamber 14, whereby two or more refractive interfaces are formed within chamber 14.

When the apparatus is lowered or dropped into a vertical borehole or drill pipe, and maintains therefore a substantially vertical position, the liquid level in chamber 14 is substantially perpendicular to the axis of the apparatus. The beam of light from the diaphragm opening 18 has therefore a normal angle of incidence with regard to the refracting interface within chamber 14, this normal refraction causing the desired image to be formed at the center of the light-sensitive surface 6.

When, however, the apparatus assumes a slanting position, as, for example, in crooked or deviating boreholes, the liquid level in chamber 14 retains by gravity a horizontal position, and assumes therefore a different angle with regard to the axis of the apparatus causing a deflection from the original direction of the light beams passing through that level. Under these conditions, the refraction occurring at the interface or interfaces within chamber 14 causes the desired image to be shifted away from the center of the light-sensitive surface 6, the extent of said shift giving a measure of the deviation of the apparatus from the vertical.

Figure 2:
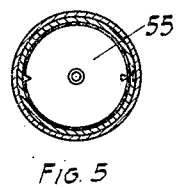
Fig. 2 is a cross-section view of a portion of a modified embodiment of Fig. 1 used for measuring and orienting the deviation of a borehole from the vertical.

If, besides the extent of deviation of a borehole, it is also desired to determine the azimuth of the deviation plane, the present apparatus may be modified as shown in Fig. 2, by inserting a compass having a completely or partly transparent dial 55a supported by a spider or glass plate 57 between the lamp 26 and the level of the liquid, an image of said dial being projected on the light-sensitive surface 6.

Figure 3:
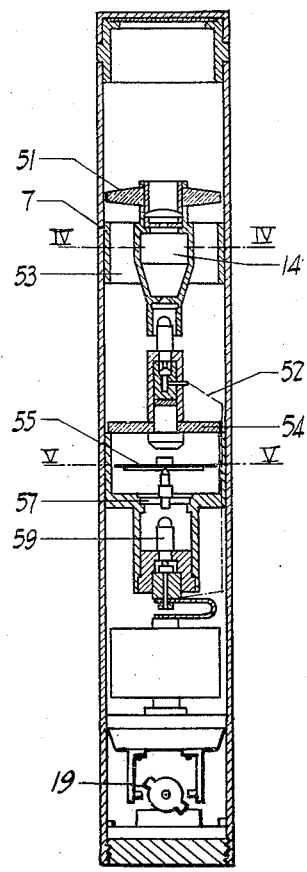
Fig. 3 is a diagrammatic elevation view in cross-section of another preferred embodiment of the present invention.
Figure 4:
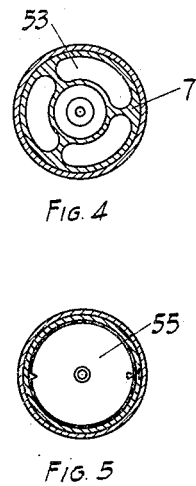
Fig. 4 is a horizontal cross-section view taken along line IV—IV of Fig. 3.
Figure 5:
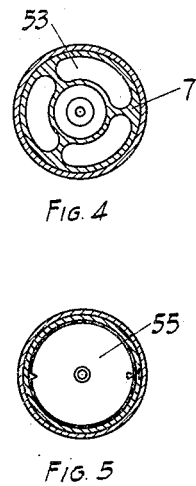
Fig. 5 is a horizontal cross-section view taken along line V—V of Fig. 3.

In order, however, to avoid the distortion of the image obtained thereby, which image may become somewhat shifted as a whole as a result of the refraction of the light beams at the surface of the liquid, it may be sometimes preferable to use the construction shown in Fig. 3.

Besides the parts already described in connection with Fig. 1, the apparatus of Fig. 3 comprises an additional lamp 59, adapted to be illuminated simultaneously with lamp 22, an entirely or partly transparent compass dial 55, supported on a spider or glass plate 57, windows 53 provided in the fitting 7 around the chamber 14, and an annular lens 51. An image of the transparent dial 55, formed by light rays passing from lamp 59 through said dial and through the windows 53, and focused by the annular lens 51 on the light-sensitive surface 6, is therefore superimposed on the image projected on said surface through chamber 14, and serves to orient said last image.

I claim as my invention:

1. In a device for orienting boreholes, a casing containing a source of light, a light-sensitive surface, a body comprising at least two immiscible fluids of different optical densities between said light and said surface, said fluids tending to form by gravity at least one horizontal interface, and means to project a directed beam of light from said source on said surface through said interface in a direction fixed with regard to said casing.

2. In a device for orienting boreholes, a casing containing at least one source of light, a light-sensitive surface, a chamber comprising at least two immiscible fluids of different optical densities between the light source and said surface, said fluids tending to form by gravity at least one horizontal interface, a compass indicator between the light source and said surface, means for projecting a directed beam of light from said source on said surface through said interface in a direction fixed with regard to said casing, and means for projecting on said surface an image of the compass indicator.

3. In a device for orienting boreholes, a casing containing at least one source of light, a light-sensitive surface, a chamber comprising at least two immiscible fluids of different optical densities between the light source and the light-sensitive surface, said fluids tending to form by gravity at least one horizontal interface, a compass indicator between the light source and the light-sensitive surface, an annular passage between said chamber and the casing, means for projecting through the interface of the liquid on the light-sensitive surface an image of the source of light, and means for projecting thereon through said annular passage an image of the compass indicator.

4. In a device for orienting boreholes, an elongated casing containing a source of light, a light-sensitive surface, a body comprising at least two immiscible fluids of different optical densities between said light and said surface, said fluids tending to form by gravity at least one horizontal interface, and means to project a directed beam of light from said source on said surface through said interface in a fixed direction substantially parallel with the longitudinal axis of the casing.

ALPHONS GERARD HUBERT STRAATMAN.